(12) United States Patent
Suau et al.

(10) Patent No.: US 8,445,561 B2
(45) Date of Patent: *May 21, 2013

(54) USE IN A HYDRAULIC BINDER COMPOSITION OF A DRY-GROUND CALCIUM CARBONATE WITH A COPOLYMER OF (METH)ACRYLIC ACID AND AN ALKOXY OR HYDROXY POLYALKYLENEGLYCOL GROUP

(75) Inventors: Jean-Marc Suau, Lucenay (FR); Jacques Mongoin, Quincieux (FR); Yves Kensicher, Theize (FR); Olivier Guerret, La Tour de Salvagny (FR)

(73) Assignee: Coatex S.A.S., Genay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,168

(22) Filed: May 23, 2012

(65) Prior Publication Data

US 2012/0227634 A1    Sep. 13, 2012

Related U.S. Application Data

(63) Continuation of application No. 13/226,906, filed on Sep. 7, 2011, now abandoned, which is a continuation of application No. 12/529,442, filed as application No. PCT/IB2008/000610 on Feb. 26, 2008, now abandoned.

(30) Foreign Application Priority Data

Mar. 5, 2007 (FR) ..................... 07 01593

(51) Int. Cl.
C04B 24/24 (2006.01)
C01F 11/18 (2006.01)
C08K 3/10 (2006.01)

(52) U.S. Cl.
USPC .............................. 524/5; 524/436; 423/430

(58) Field of Classification Search
USPC ...................................... 524/5, 436; 423/430
See application file for complete search history.

(56) References Cited

U.S. PATENT DOCUMENTS

| | | | |
|---|---|---|---|
| 4,013,602 | A | 3/1977 | Delfosse et al. |
| 2002/0091177 | A1 | 7/2002 | Gonnon et al. |
| 2008/0227890 | A1 | 9/2008 | Maeder et al. |
| 2009/0312459 | A1 | 12/2009 | Gane et al. |
| 2009/0326101 | A1 | 12/2009 | Suau et al. |
| 2010/0076139 | A1 | 3/2010 | Mongoin et al. |
| 2010/0111809 | A1 | 5/2010 | Suau et al. |
| 2011/0319526 | A1 | 12/2011 | Suau et al. |
| 2011/0319544 | A1 | 12/2011 | Suau et al. |
| 2012/0053280 | A1 | 3/2012 | Mongoin et al. |

FOREIGN PATENT DOCUMENTS

| | | |
|---|---|---|
| EP | 1 201 624 | 5/2002 |
| JP | 01-151955 | 6/1989 |
| JP | 10 338518 | 12/1998 |
| WO | 2005 123621 | 12/2005 |

OTHER PUBLICATIONS

Prescott, P.I.; Pruett, R.J. "Ground calcium carbonate: Ore mineralogy, processing and markets." Mining Engineering, Jun. 1996, 79-84.
U.S. Appl. No. 13/470,882, filed May 14, 2012, Suau et al.

*Primary Examiner* — John Uselding
(74) *Attorney, Agent, or Firm* — Oblon, Spivak, McClelland, Maier & Neustadt, L.L.P.

(57) ABSTRACT

Provided are a method of dry-grinding calcium carbonate in the presence of a grinding aid agent which is a copolymer of (meth)acrylic acid with a monomer containing an alkoxy or hydroxy polyalkyleneglycol group, and a method of producing a hydraulic binder base including dry grinding a calcium carbonate in the presence of the grinding aid.

20 Claims, No Drawings

USE IN A HYDRAULIC BINDER COMPOSITION OF A DRY-GROUND CALCIUM CARBONATE WITH A COPOLYMER OF (METH)ACRYLIC ACID AND AN ALKOXY OR HYDROXY POLYALKYLENEGLYCOL GROUP

CROSS REFERENCE TO RELATED APPLICATIONS

The present application is a continuing application based on U.S. application Ser. No. 13/226,906, which was a continuation of U.S. application Ser. No. 12/529,442, which was the national stage of international application PCT/IB2008/000610, filed on Feb. 26, 2008, published as WO 2008/107790, and claims the benefit of the filing date of French Application No. 0701593, filed on Mar. 5, 2007. The text of each of these applications is incorporated by reference.

The present invention concerns the field of compositions with hydraulic binder bases, containing at least one mineral matter which is a calcium carbonate obtained by dry grinding.

Grinding using a dry process (as opposed to in an aqueous medium) of calcium carbonate is described in the documents "Beitrag zur Aufklärung der Wirkungsweise von Mahlhilfsmitteln" ("Freiberger Forschungshefte" VEB Deutscher Verlag für Grundstoffundustrie, Leipzig, Germany (1975)). and "Calcium Carbonate" (Birkhäuser Verlag, 2001).

This grinding, which leads to a reduction in the size of the individual particles of calcium carbonate by mechanical action, is assisted by grinding agents which can be classified into the following 3 categories.

The first comprises the weak acids (formic, acetic, lactic, adipic as mentioned in document FR 2 863 914, or stearic as indicated in document EP 0 510 890), and their salts (sodium lignin sulfonate, sodium acetate, etc.). The second includes the weak bases, and notably the amines (see document GB 2 179 268). The third, and the most commonly used, since it is the most effective, includes the glycol-based alcohols, including notably diethylene glycol illustrated in documents WO 2002/081 573 and US 2003/019 399.

Although they are still the most effective, the latter lead to calcium carbonates with a high quantity of volatile organic compounds (VOCs). For this reason, finding an alternative solution to these glycol-based grinding aid agents which is at least as effective as them in terms of the final application would constitute a major contribution to the state of the technique.

With this regard, a first object of the invention consists in the use, in a composition with a hydraulic binder base, of a calcium carbonate characterised in that the said carbonate is dry-ground in the presence of a grinding aid agent, firstly, and in that the grinding aid agent is, secondly, a copolymer, consisting:

a) of at least one anionic monomer chosen from among acrylic acid, methacrylic acid and their blends,
b) and of at least one non-ionic monomer, of formula (I):

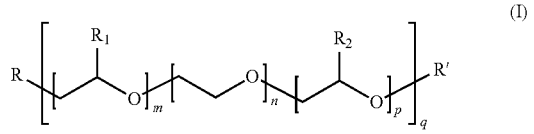

where:
m, n, p and q are integers such that: m, n, p$\leq$150, q$\geq$1, and 5$\leq$(m+n+p)q$\leq$150, and preferentially 15$\leq$(m+n+p)q$\leq$120,
$R_1$ represents hydrogen or the methyl or ethyl radical,
$R_2$ represents hydrogen or the methyl or ethyl radical,
R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide,
R' represents hydrogen or a hydrocarbonated radical with 1 to 40 carbon atoms, preferentially 1 to 4 carbon atoms, where R' is very preferentially the methyl radical,
or a blend of several monomers of formula (I),
c) and possibly of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, $\alpha$-methylstyrene, styrene sulfonate, or acrylamido-2-methyl-2-propane-sulfonic acid, or from among the organo-phosphate monomers, such as preferentially the acrylate and methacrylate phosphates of ethylene glycol, or the acrylate and methacrylate phosphates of oxyethylene and/or oxypropylene glycol, and their blends.

This grinding aid agent may be designated using the expression of a copolymer of methacrylic acid with a monomer containing an alcoxy or hydroxy polyalkyleneglycol group.

The examples of the present application show that, in comparison with a calcium carbonate which is dry ground with a diethylene glycol, a calcium carbonate according to the invention enables a composition to be obtained with a hydraulic binder base such as a mortar with a much higher degree of spreading.

This use is also characterised in that the said copolymer consists, expressed as a percentage by weight of the monomers (the sum of the percentages by weight of all the monomers equals 100%):

a) 0.5% to 50%, preferentially 1% to 25%, and very preferentially 5% to 20%, of at least one anionic monomer chosen from among acrylic acid, methacrylic acid and their blends,
b) 50% to 99.5%, preferentially 75% to 99%, and very preferentially 80% to 95%, of at least one non-ionic monomer, of formula (I):

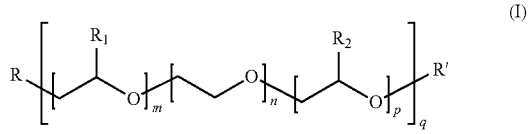

where:
- m, n, p and q are integers such that: m, n, p≦150, q≧1, and 5≦(m+n+p)q≦150, and preferentially 15≦(m+n+p)q≦120,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide,
- R' represents hydrogen or a hydrocarbonated radical with 1 to 40 carbon atoms, preferentially 1 to 4 carbon atoms, where R' is very preferentially the methyl radical, or a blend of several monomers of formula (I), c) 0% to 50% of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

This use is also characterised in that the said copolymer is obtained in the acidic form and possibly distilled, and is possibly partially or totally neutralised by one or more neutralisation agents having a monovalent or polyvalent cation, where the said agents are chosen preferentially from among ammonia or from among calcium, magnesium hydroxides and/or oxides, or from among sodium, potassium or lithium hydroxides, or from among the aliphatic and/or cyclic primary, secondary or tertiary amines, such as preferentially stearylamine, the ethanolamines (mono-, di- and triethanolamine), mono- and diethylamine, cyclohexylamine, methylcyclohexylamine, amino methyl propanol, morpholine, and preferentially in that the neutralisation agent is chosen from among triethanolamine and sodium hydroxide.

This use is also characterised in that the said copolymer is obtained by processes of radical polymerisation in solution, in a direct or reverse emulsion, in suspension or precipitation in solvents, in the presence of catalytic systems and chain transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This use is also characterised in that the said copolymer may possibly, before or after the total or partial neutralisation reaction, be treated and separated into several phases, according to static or dynamic processes known to the skilled man in the art, by one or more polar solvents belonging preferentially to the group constituted by water, methanol, ethanol, propanol, isopropanol, the butanols, acetone and tetrahydrofuran or their blends.

One of the phases then corresponds to the polymer used according to the invention.

This use is also characterised in that 0.05% to 5%, preferentially 0.1% to 3%, and very preferentially 0.1% to 1%, by dry weight of the said copolymer relative to the dry weight of calcium carbonate is used during the dry grinding of the said carbonate.

This use is also characterised in that the composition with a hydraulic binder is a cement, a concrete or a mortar.

A second purpose of the invention consists of the compositions with a hydraulic binder base obtained by the use of dry-ground calcium carbonate according to the invention.

EXAMPLES

In these examples, all the grinding operations are undertaken according to a method well known to the skilled man in the art (document FR 2 901 491 describes such a method). We shall confine ourselves here to indicating the final granulometry of the particles of calcium carbonate obtained after grinding (the skilled man in the art in reality knows how to modify the parameters of the process with a view to obtaining such a granulometry; however, one may also refer to the above-mentioned document).

In each of the tests n° 1 to 4, a mortar is produced by blending whilst stirring, according to the basic knowledge of the skilled man in the art, a standard sand (EN 196-1), cement (CEM I 42.5 PM ES), tap water and a calcium carbonate ground according to the prior art or according to the invention (the proportions are given in table 1).

This preparation is used to fill an Abrams mini-cone (minimum weight: 4 kg, upper diameter: 50 mm, lower diameter: 100 mm, height: 150 mm). The cone is positioned on a PVC plate dampened using a sponge.

Filling lasts 2 minutes, and the contents of the cone are settled by regularly "pricking" 25 times the preparation inside the cone using a metal rod.

The cone is then raised when it is filled; its contents are spread on the PVC plate. After 30 seconds the spreading is determined by measuring the length in mm of two perpendicular diameters of the round cake obtained, and by taking the average of the two.

Test No. 1

This test illustrates the prior art and uses a calcium carbonate obtained by dry grinding in the presence of 3000 ppm (relative to the dry weight of calcium carbonate) of a grinding agent of the prior art, which is diethylene glycol.

After grinding a calcium carbonate is obtained, 73.8% and 48.5% by weight of the particles of which have an average diameter lower respectively than 2 μm and 1 μm (as measured using a Sedigraph™ 5100).

Test No. 2

This test illustrates an embodiment of the invention and uses a calcium carbonate obtained by dry grinding in the presence of 3000 ppm (relative to the dry weight of calcium carbonate) of a grinding agent of the invention which is a polymer consisting, by weight percentage, 81.5% of methoxy polyethylene glycol methacrylate of molecular weight 2000, 4.9% of methacrylic acid, and 13.6% of acrylic acid.

After grinding a calcium carbonate is obtained, 74.5% and 44.1% by weight of the particles of which have an average diameter lower respectively than 2 μM and 1 μm (as measured using a Sedigraph™ 5100).

Test No. 3

This test illustrates the prior art and uses a calcium carbonate obtained by dry grinding in the presence of 1400 ppm (relative to the dry weight of calcium carbonate) of a grinding agent of the prior art, which is diethylene glycol.

After grinding a calcium carbonate is obtained, 47.1% and 30.0% by weight of the particles of which have an average diameter lower respectively than 2 μm and 1 μm (as measured using a Sedigraph™ 5100).

Test No. 4

This test illustrates an embodiment of the invention and uses a calcium carbonate obtained by dry grinding in the presence of 1400 ppm (relative to the dry weight of calcium carbonate) of a grinding agent of the invention which is a polymer consisting, by weight percentage, 81.5% of methoxy polyethylene glycol methacrylate of molecular weight 2000, 4.9% of methacrylic acid, and 13.6% of acrylic acid.

After grinding a calcium carbonate is obtained, 45.4% and 28.0% by weight of the particles of which have an average diameter lower respectively than 2 μm and 1 μm (as measured using a Sedigraph™ 5100).

The polymer used in tests n° 2 and 4 is obtained by polymerisation techniques well known to the skilled man in the art.

In a first beaker the following are introduced at ambient temperature and whilst stirring: 259.02 of methoxy polyethylene glycol methacrylate of molecular weight equal to 2000 g/mol, a solution containing 15.36 g of methacrylic acid and 274.39 g of water, a solution containing 69.86 g of untreated water and 50.25 g of acrylic acid In a second beaker the following are introduced at ambient temperature and whilst stirring: 2.38 g of thiolactic acid (of 98.5% mass purity) and 52.14 g of water.

In a third beaker the following are introduced at ambient temperature and whilst stirring: 2.84 g of ammonium persulphate $(NH_4)_2S_2O_8$ and 51.90 g of water.

In a fourth beaker the following are introduced at ambient temperature and whilst stirring: 0.56 g of ammonium persulphate $(NH_4)_2S_2O_8$ and 10.87 g of water.

In a single-casing cylindrical reactor, surmounted by a refrigerating column, by an anchor stirring system and 3 inlets, 351.39 g of water and 295.61 g of isopropanol are introduced. The reactive medium is heated whilst stirring (230 rpm) to 84±2° C. The contents of the first 3 beakers are introduced into the reactive medium in 2 hours. The introduction nozzles are then rinsed with 20.84 g of water (this water goes directly into the reactive medium). The solution of the 4$^{th}$ beaker is then added to the reactive medium, and the blend is fired for 1 hour at 84±2° C. (at 230 rpm). At the end of the reaction the device is rinsed with 52.13 g of water. The temperature is then raised and 604.78 g is distilled. The temperature is brought down to between 50 and 60° C., and 69.34 g of sodium hydroxide at 50% mass in water is added to the reactive medium. Finally the medium is diluted with 20.85 g of water. It is cooled again before obtaining the polymer of the invention.

The compositions of each mortar and the spreading values are given in table 1.

TABLE 1

|  | Test n° | | | |
|---|---|---|---|---|
|  | 1 | 2 | 3 | 4 |
| Prior Art/Invention | PA | IN | PA | IN |
| Sand | 1767 | 1767 | 1767 | 1767 |
| Cement | 500 | 500 | 500 | 500 |
| Water | 234.85 | 234.85 | 234.85 | 234.85 |
| Dry-ground CaCO3 | 150.15 | 150.15 | 150.15 | 150.15 |
| Spreading (mm) | 130 | 150 | 125 | 155 |

By comparing tests the 2 by 2 (1 to 2, and 3 to 4), it is observed that the spreading of the mortars in the context of the invention is much higher than for mortars formulated with calcium carbonates of the prior art.

The invention claimed is:

1. A method of dry grinding calcium carbonate, the method comprising:
   (1) contacting a calcium carbonate with a grinding aid agent comprising a copolymer which comprises, in polymerized form:
   (a) an anionic monomer comprising acrylic acid, methacrylic acid, or a mixture thereof,
   (b) a non-ionic monomer of formula (I)

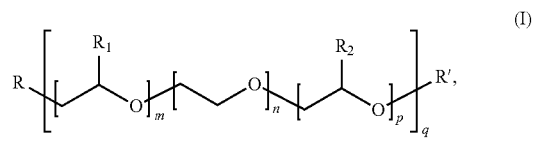

wherein
   m, n, p, and q are integers such that m, n, and p≦150, q≧1, and 5≦(m+n+p)q≦150,
   $R_1$ and $R_2$ independently are hydrogen, a methyl radical, or an ethyl radical,
   R is a radical comprising an unsaturated polymerizable function which is vinylic, an acrylic ester, a methacrylic ester, a maleic ester, an acrylurethane, a methacrylurethane, an α-α' dimethyl-isopropenyl-benzylurethane, an allylurethane, an optionally substituted allylic ether, an optionally substituted vinylic ether, an ethylenically unsaturated amide, an ethylenically unsaturated imide, an acrylamide, or a methacrylamide, and
   R' is hydrogen or a hydrocarbon radical comprising 1 to 40 carbon atoms; and
   (c) optionally, a further monomer comprising (meth)acrylic anhydride, (meth)acrylamide, a (meth)acrylic ester with 1 to 20 carbon atoms in its ester radical, a hydroxylated methacrylate, an aromatic vinylic monomer, an organophosphate monomer, or a mixture thereof; and
   (2) dry grinding the calcium carbonate and the grinding aid.

2. The method of claim 1, wherein the copolymer comprises, expressed as a percentage by weight of the monomers, wherein a sum of the percentages by weight of all the monomers equals 100%:
(a) 0.5% to 50% of the anionic monomer;
(b) 50% to 99.5% of the non-ionic monomer of formula (I); and
(c) 0% to 50% of the further monomer.

3. The method of claim 1, wherein the copolymer is in acidic form and optionally distilled, and, optionally, is partially or totally neutralized with at least one neutralization agent having a monovalent or polyvalent cation, wherein the at least one neutralization agent is selected from the group consisting of ammonia, calcium hydroxide, calcium oxide, magnesium hydroxide, magnesium oxide, sodium hydroxide, potassium hydroxide, lithium hydroxide an aliphatic primary amine, an aliphatic secondary amine, an aliphatic tertiary amine, a cyclic secondary amine, and a cyclic tertiary amine.

4. The method of claim 1, wherein the copolymer is obtained by radical polymerization.

5. The method of claim 3, wherein the copolymer is completely or partially neutralized and, before or after the total or partial neutralization reaction, is treated and separated into several phases, according to static or dynamic processes by at least one polar solvent selected from the group consisting of water, methanol, ethanol, propanol, isopropanol, a butanol, acetone, and tetrahydrofuran.

6. The method of claim 1, wherein 0.05% to 5% by dry weight of the copolymer relative to a dry weight of the calcium carbonate is employed during the dry grinding.

7. The method of claim 1, wherein, in the copolymer, m, n, p, and q are integers such that: $15 \leq (m+n+p)q \leq 120$.

8. The method of claim 1, wherein, in the copolymer, R' is a hydrocarbon radical comprising 1 to 4 carbon atoms.

9. The method of claim 1, wherein, in the copolymer, R' is a methyl radical.

10. The method of claim 1, wherein, in the copolymer, the further monomer is present and is methyl acrylate, ethyl acrylate, isopropyl acrylate, n-propyl acrylate, isobutyl acrylate, n-butyl acrylate, tert-butyl acrylate, 2-ethylhexyl acrylate, methyl methacrylate, or ethyl methacrylate.

11. The method of claim 1, wherein, in the copolymer, the further monomer is present and is hydroxyethyl methacrylate, hydroxypropyl methacrylate, styrene, α-methylstyrene, styrene sulfonate, or acrylamido-2-methyl-2-propane-sulfonic acid.

12. The method of claim 2, wherein, in the copolymer, the anionic monomer is present in 1% to 25% by weight.

13. A method for producing a hydraulic binder base, the method comprising:
dry grinding a calcium carbonate in the presence of a grinding aid agent comprising a copolymer which comprises, in polymerized form:
(a) an anionic monomer comprising acrylic acid, methacrylic acid, or a mixture thereof,
(b) a non-ionic monomer of formula (I)

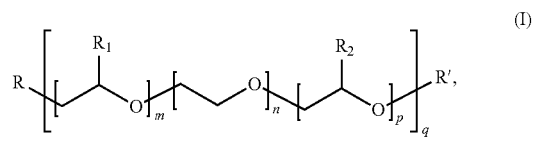

wherein
m, n, p, and q are integers such that m, n, and $p \leq 150$, $q \geq 1$, and $5 \leq (m+n+p)q \leq 150$,
$R_1$ and $R_2$ independently are hydrogen, a methyl radical, or an ethyl radical,
R is a radical comprising an unsaturated polymerizable function which is vinylic, an acrylic ester, a methacrylic ester, a maleic ester, an acrylurethane, a methacrylurethane, an α-α' dimethyl-isopropenyl-benzylurethane, an allylurethane, an optionally substituted allylic ether, an optionally substituted vinylic ether, an ethylenically unsaturated amide, an ethylenically unsaturated imide, an acrylamide, or a methacrylamide, and
R' is hydrogen or a hydrocarbon radical comprising 1 to 40 carbon atoms; and
(c) optionally, a further monomer comprising (meth) acrylic anhydride, (meth)acrylamide, a (meth)acrylic ester with 1 to 20 carbon atoms in its ester radical, a hydroxylated methacrylate, an aromatic vinylic monomer, an organophosphate monomer, or a mixture thereof.

14. The method of claim 13, wherein the copolymer comprises, expressed as a percentage by weight of the monomers, wherein the sum of the percentages by weight of all the monomers equals 100%:
(a) 0.5% to 50% of the anionic monomer;
(b) 50% to 99.5% of the non-ionic monomer of formula (I); and
(c) 0% to 50% of the further monomer.

15. The method of claim 13, wherein the copolymer of the grinding aid is in acidic form.

16. The method of claim 13, wherein the copolymer of the grinding aid is partially neutralized.

17. The method of claim 13, wherein 0.05% to 5% by dry weight of the copolymer relative to a dry weight of the calcium carbonate is employed during the dry grinding.

18. The method of claim 14, wherein, in the copolymer, the anionic monomer (c) is present in 1% to 25% by weight.

19. The method of claim 1, wherein, in the non-ionic monomer of formula (I) in the copolymer, m and $n \geq 1$, and R' is a hydrocarbon radical comprising 1 to 4 carbon atoms.

20. The method of claim 1, further comprising distilling the copolymer before the dry grinding.

\* \* \* \* \*